Oct. 8, 1940.   C. B. SPASE   2,217,529
FRICTION CLUTCH
Filed Sept. 29, 1937   3 Sheets-Sheet 1

INVENTOR.
Charles B. Spase
BY Bedell & Thompson
ATTORNEYS.

Oct. 8, 1940.  C. B. SPASE  2,217,529
FRICTION CLUTCH
Filed Sept. 29, 1937  3 Sheets-Sheet 2

INVENTOR.
Charles B. Spase
BY Bedell & Thompson
ATTORNEYS

Oct. 8, 1940.   C. B. SPASE   2,217,529
FRICTION CLUTCH
Filed Sept. 29, 1937   3 Sheets-Sheet 3
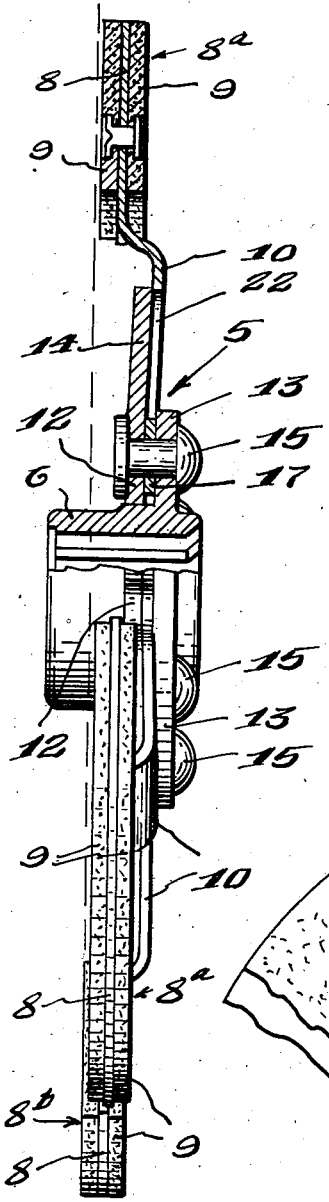
Fig-3-
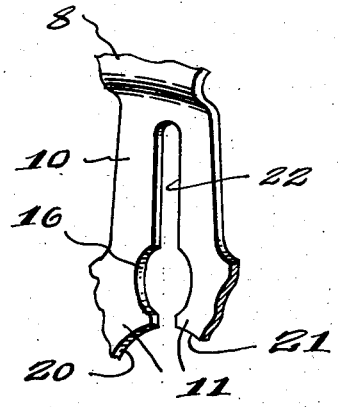
Fig-4-
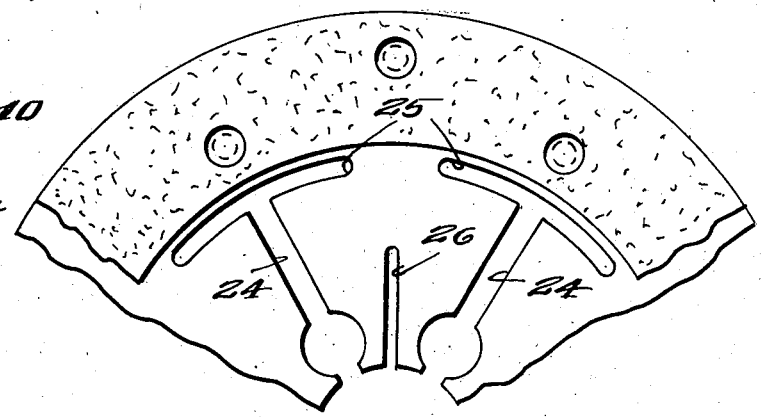
Fig-5-
INVENTOR.
BY Charles B. Spase
Bodell & Thompson
ATTORNEYS.

Patented Oct. 8, 1940

2,217,529

UNITED STATES PATENT OFFICE 2,217,529

FRICTION CLUTCH

Charles B. Spase, Nedrow, N. Y., assignor to W. C. Lipe, Inc., Syracuse, N. Y., a corporation of New York Application September 29, 1937, Serial No. 166,376

9 Claims. (Cl. 192—68)

This invention relates to friction clutches, such as are used in motor vehicles, or to motion transmitting elements, such as the driven element or disk of a friction clutch, and has for its object, a friction clutch including a clutch plate or disk, which is composed of segments, together with means, as a cushion plate, for normally holding some of the segments, as alternate segments, out of circumferential alinement with the remaining or intermediate segments, so that some of the segments engage slightly in advance of the others, when the clutch is being engaged, and the clutch, when fully engaged, engages equally throughout its area or compensates for slight misalinements of the clutch shaft or surfaces, which should be, or are intended to be, at a right angle to the axis of the clutch shaft.

It further has for its object a clutch plate including segments mounted so as to coact with the hub of the clutch plate to have a dampening effect under distortion due to torsional impulses.

It further has for its object a clutch of the type which is especially economical in construction and at the same time highly efficient and durable in use.

The invention consists in the novel features and in the combinations and constructions hereinafter set forth and claimed.

In describing this invention, reference is had to the accompanying drawings, in which like characters designate corresponding parts in all the views.

Figure 3 is a sectional view of the clutch plate, partly in elevation, showing some of the segments out of alinement with the adjacent segments.

Figure 4 is a fragmentary isometric view of a section of the clutch plate showing particularly the construction of the inner margin where it is attached to the hub.

Figure 5 is a fragmentary view of a slightly different form of segmental disk from that shown in Figure 2.

The clutch plate is for clutches of the type including driving and driven elements with the clutch plate, which is one of said elements, usually the driven element, frictionally held between the other or driving element and an axially shiftable pressure ring, or its equivalent.

Figure 1:
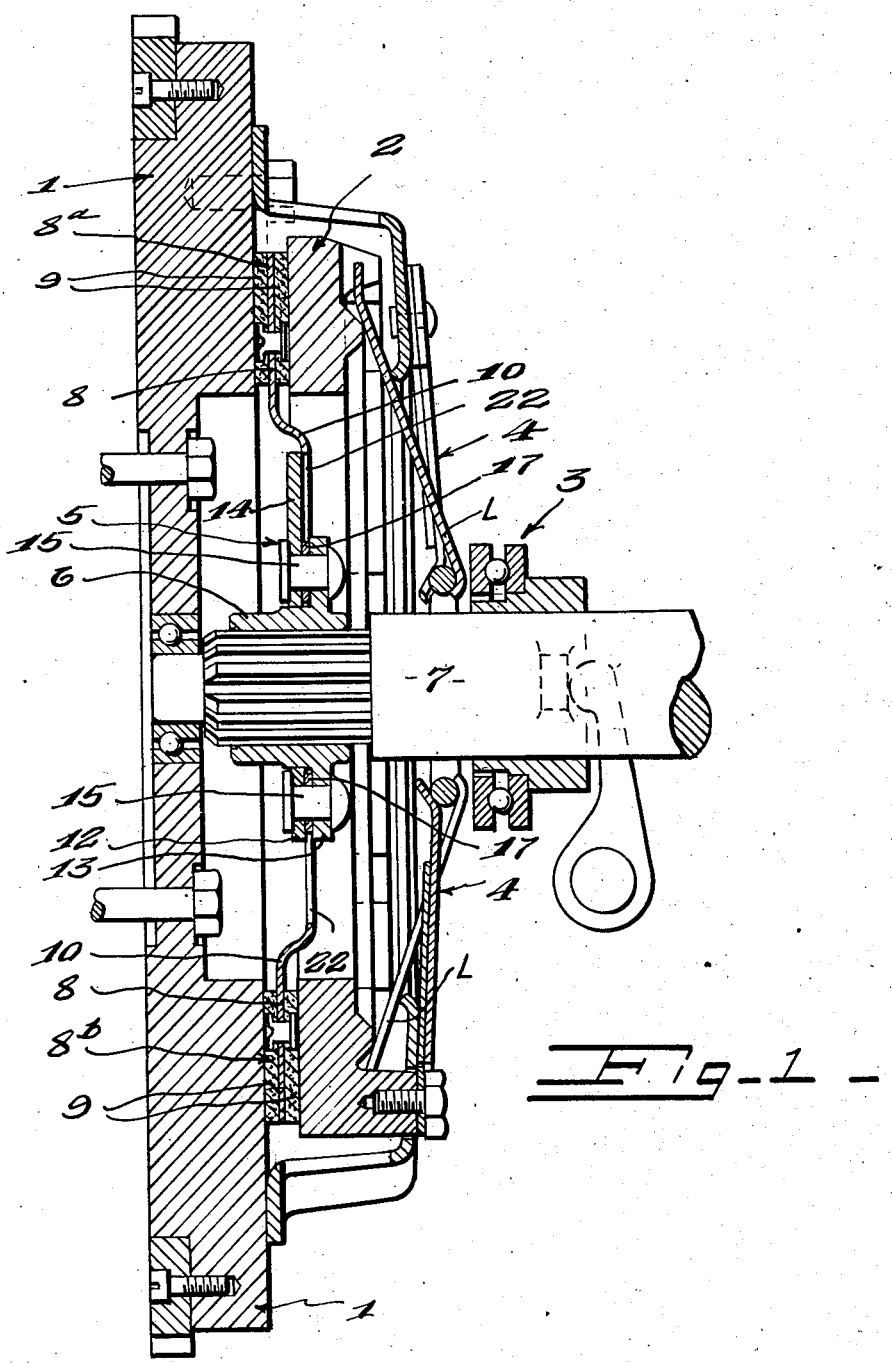
Figure 1 is a sectional view, partly in elevation, of a clutch embodying this invention.

In Figure 1, 1 designates the driving element, which is usually the fly wheel of the engine of the vehicle; 2 the pressure ring rotatable with the fly wheel; 3 the throw-out sleeve operated by the clutch pedal; 4 the clutch spring; and 5 the clutch plate. The clutch spring normally holds the clutch engaged and upon depression of the food pedal, the pressure plate is released of the action of the clutch spring through the usual levers L, thus releasing the clutch in the usual manner.

The clutch plate 5 includes a hub 6, usually slidably splined on the clutch shaft 7, and a disk 8 carried by the hub and having its opposite margins provided with usual friction faces 9 interposed between the fly wheel and the pressure ring.

Figure 2:
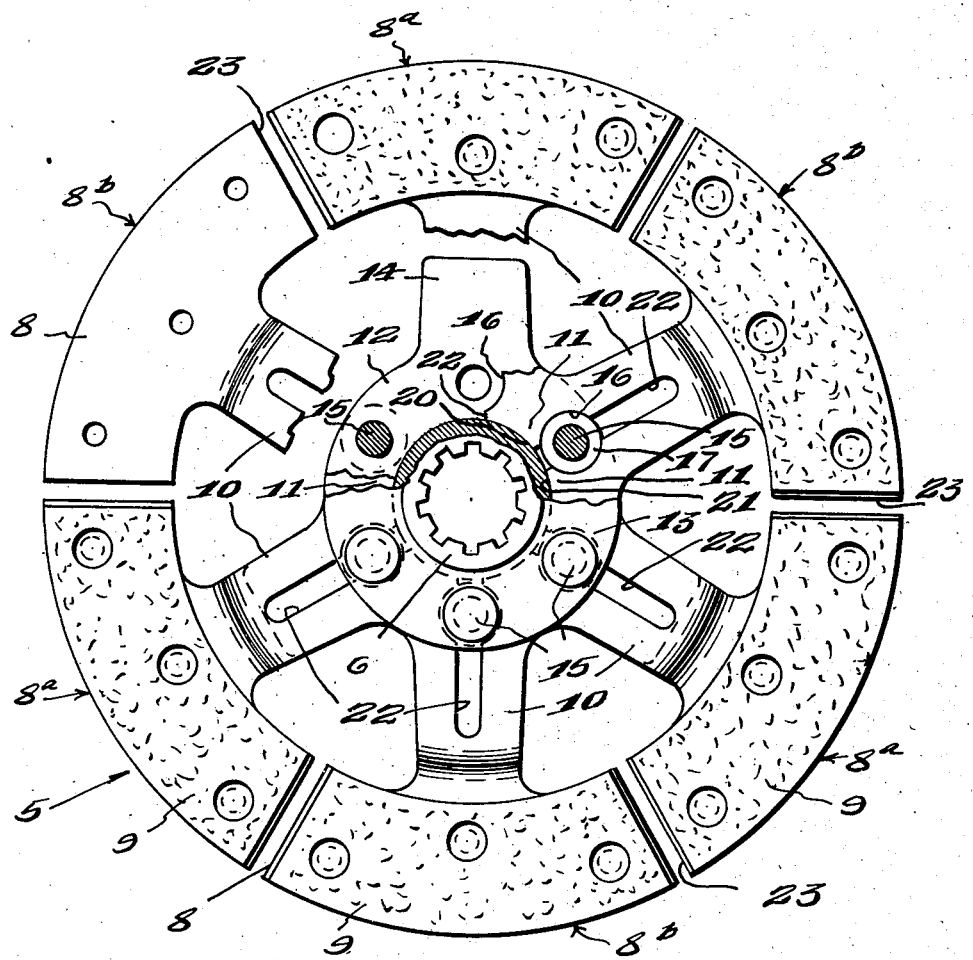
Figure 2 is an elevation, partly broken away, of the clutch plate.

In the illustrated embodiment of my invention, the disk 8 is composed of radial segments, and in the form shown in Figures 2 and 3, these segments are separate or divided from each other and formed with arcuate ends on which the friction faces are mounted, and inwardly extending spokelike portions 10, the inner edges 11 of which are arranged adjacent the periphery of the hub. The friction faces are preferably but not necessarily segments coextensive with the arcuate ends. Some of the segments of the clutch plate are normally located out of circumferential alinement with the adjacent segments, and in the illustrated embodiment of my invention, every other, or alternate segments, are tensioned out of circumferential alinement with the adjacent segment. 8ª designates the segments that are normally tensioned out of alinement with the remaining segments 8ᵇ, as seen in Figure 3. The segments 8ª are normally under tension and pressed axially in one direction by a spring or cushion plate which normally holds them sprung out of circumferential alinement with the adjacent segments 8ᵇ.

12 designates the cushion plate, this being opposed to an external annular flange 13 on the hub 6 and having radially extending arms 14 pressing against the spokes 10 of the segments 8ª in one direction, preferably in the direction of the pressure ring or toward the pressure ring side of the clutch plate, the spring arms being inclined slightly, as seen in Figure 3, in an axial direction out of a plane at a right angle to the axis of the clutch, so as to apply pressure to the spokes 10 of the segments 8ª, the radial arms terminating intermediate of the ends of the spokes, as seen in Figures 2 and 3.

The cushion plate is tensioned sufficiently to press the segments 8ª out of circumferential alinement with the segments 8ᵇ. The cushion plate is secured in position by clamping members, as rivets 15, extending through the flange 13, perforations 16, in the segments or spokes thereof, and through the body of the cushion plate 12. An individual spacer 17 encircles each rivet and is located in the perforation 16. The spacers 17 constitute spacing means to hold the cushion plate from clamping on the disk or the segments thereof.

In operation, when the clutch is being engaged, the segments 8ᵇ are primarily in advance of the segments 8ᵃ, and hence engage the driving element or fly wheel in advance of the segments 8ᵃ, so that if there are any axial misalinements in the clutch, the clutch plate will engage the pressure ring and also the fly wheel or driving element at points spaced equidistant in a circumferential direction, and then as the clutch comes under full engagement under the action of the clutch spring, the segments 8ᵃ will be pressed into alinement with the segments 8ᵇ so that the clutch plate engages substantially equally throughout its area in a circumferential direction, regardless of slight misalinements in the clutch shaft or fly wheel or misalinements due to inaccurate facing off of the fly wheel or of the meeting faces of the bell housing or the fly wheel housing, which, as will be understood by those skilled in the art, should be normal or at right angles to the axis of the clutch.

The disk, owing to its formation, also has a dampening action to dampen vibrations. Each spokelike portion 10 at its inner end toward the hub 6 is provided with surfaces 20, 21 on opposite sides of the radial line passing through the rivet 15, for engaging the periphery of the hub under distortion due to torsional impulses tending to effect relative rotation of the disk and the hub, and causing the spokelike portions 10 to move or distort slightly about the spacers 17, as a fulcrum, and the surface 20 or 21 to snub on the periphery of the hub. If the impulse is from the disk, assuming that the disk is rotating to the left, then the surface 20 will snub on the hub. If the impulse originates in the clutch shaft and is transmitted through the hub, as when a vehicle is coasting ahead of the engine speed, then the hub will snub on the surface 21. Preferably to increase or facilitate the distortion, each spokelike portion 10 is formed with a radial slot 22 separating the snubbing faces 20, 21 and also intersecting the perforations 16.

As the radial, or what for brevity's sake, are called spokelike portions 10 of the disk fulcrum about the spacers 17 in a circumferential direction under torsional impulses tending to effect relative rotation of the disk and the hub in one direction or the other, the wall of the central opening of the disk distorts and contracts. As the spokelike portions are equidistantly spaced, this causes a uniform contraction and causes the walls of the opening to bind or snub at spaced apart points on the hub 6. An analysis of this contracting or distortion indicates that the surfaces 20 on like sides of the slots 22 snub on the hub 6 when the relative rotation is in one direction, and the surfaces 21, when the rotation is in the other direction. Upon dismantling of the clutch after long use, a greater snubbing effect is indicated by the greater wear on the surfaces 20 which snub when the disk or spokelike portions 10 are distorted under the influence of sudden acceleration of the driving member of the clutch than on the surfaces 21 which snub under sudden deceleration or sudden acceleration of the driven member of the clutch, as when coasting.

In the form shown in Figure 2, the segments are entirely separated at 23, but as seen in Figure 5, the disk may be slotted, as at 24, 25 and 26 to render it in effect segmental and capable of distortion, forming segments of which the alternate ones are acted upon by the spring arms 14 of the cushion plate.

What I claim is:

1. In a clutch plate for clutches of the type including driving and driven elements in which the plate is one of said elements, and the margin thereof frictionally held between the other of said elements and an axially shiftable pressure ring or its equivalent, the clutch plate including a hub, and a disk having radial segments and a cushion plate pressing on spaced apart segments and applying tension to the same in an axial direction relative to the other segments, whereby the segments on which the cushion plate acts are normally out of circumferential alinement with their adjacent segments, and means for securing the cushion plate to the hub.

2. In a clutch plate for clutches of the type including driving and driven elements in which the plate is one of said elements and the margin thereof frictionally held between the other element and an axially shiftable pressure ring, or its equivalent, the clutch plate including a hub having an annular flange and a disk including radial segments, and a cushion plate mounted on the hub and having spring arms for applying pressure to some of the segments leaving the remaining segments free of such pressure, the segments extending between the said flange and the cushion plate and being formed with perforations, clamping members extending through the flange, said perforations and the cushion plate, and spacing means between the flange and the cushion plate for preventing the cushion plate from clamping on the segments.

3. In a clutch plate for clutches of the type including driving and driven elements in which the plate is one of said elements and the margin thereof frictionally held between the other element and an axially shiftable pressure ring, or its equivalent, the clutch plate including a hub having an annular flange and a disk including radial segments, and a cushion plate mounted on the hub and having spring arms for applying pressure to some of the segments leaving the remaining segments free of such pressure, the segments extending between said flange and the cushion plate and being formed with perforations, clamping members extending through the flange, said perforations and the cushion plate, and spacing means between the flange and the cushion plate for preventing the cushion plate from clamping on the segments, said spacing means comprising individual members encircling the clamping members and extending through said perforations.

4. In a clutch plate for clutches of the type including driving and driven elements in which the plate is one of said elements and the margin thereof frictionally held between the other element and an axially shiftable pressure ring or its equivalent, the clutch plate including a hub having an annular flange and a disk including radial segments, a cushion plate including an annular portion encircling the hub and radially extending spring arms spaced apart circumferentially and arranged to press axially on spaced apart segments leaving the intermediate segments free of the pressure of the cushion plate, whereby the segments on which the cushion plate acts are normally out of circumferential alinement with the remaining segments, and means for securing the cushion plate to the hub.

5. In a clutch plate for clutches of the type including driving and driven elements in which the plate is one of said elements and the margin thereof frictionally held between the other element and an axially shiftable pressure ring or its equivalent, the clutch plate including a hub having an annular flange and a disk including radial segments, a cushion plate including an annular portion encircling the hub and radially extending spring arms spaced apart circumferentially and arranged to press axially on spaced apart segments leaving the intermediate segments free of the pressure of the cushion plate, whereby the segments on which the cushion plate acts are normally out of circumferential alinement with the remaining segments, the annular portion of the cushion plate being opposed to said flange and the disk extending between the flange and the cushion plate, and clamping members extending transversely through the flange, the disk and the annular portion of the cushion plate, and means for relieving the disk of the clamping action of said clamping means.

6. A motion transmitting element including a hub and a disk comprising radial segments having inwardly extending spokelike portions, the inner edges of which are arranged adjacent the periphery of the hub and capable of distortion under torsional impulses, means for securing the spokelike portions to the hub, the spokelike portions having means at their inner ends for engaging the hub and dampening torsional vibration upon distortion of the spokelike portions under torsional impulses transmitted to the hub from the spokelike portions and from the hub to the spokelike portions.

7. A motion transmitting element including a hub and a disk comprising radial segments having inwardly extending spokelike portions, the inner edges of which are arranged adjacent the periphery of the hub and capable of distortion under torsional impulses, the hub having an annular flange and the spokelike portions lapping said flange at their inner ends, means for securing the spokelike portions at their inner ends to the flange and permitting a pivotal movement about the fastening means when under torsional impulses tending to distort the spokelike portions, the spokelike portions having surfaces at their inner edges and on opposite sides of the fastening means located to engage the hub upon torsional distortion of the spokelike portions in either direction and dampen the vibrations due to the torsional impulses.

8. A motion transmitting element including a hub and a disk having a central opening encircling the hub, and formed with radial slots opening at spaced apart points through the wall of the central opening to make the disk distortable under torsional impulses, means for securing the disk to the hub including fulcrums spaced apart equidistant from each other in a circumferential direction and also spaced radially outward from the wall of the central opening and located with their axes extending transversely of the slots, about which fulcrums the adjacent portions of the distortable disk shift in one direction or the other under the influence of torsional strains and cause the wall of the central opening to distort and snub on the hub.

9. A motion transmitting element including a hub and a disk comprising radial segments having inwardly extending spokelike portions, the inner edges of which are arranged adjacent the periphery of the hub, capable of distortion under torsional impulses, each spokelike portion being secured to the hub to have a rocking action in the direction of the plane of the disk under abnormal torsional strains, each spokelike portion being provided with means on opposite sides of the radial line thereof passing through the rocking axis, for engaging the hub under the influence of torsional impulses in one direction or the other and dampening the vibrations due to such impulses, the rocking axis being located in said radial line and spaced from the inner ends of the spokelike portions.

CHARLES B. SPASE.